(12) United States Patent
Gibson et al.

(10) Patent No.: US 11,935,060 B1
(45) Date of Patent: Mar. 19, 2024

(54) SYSTEMS AND METHODS BASED ON ANONYMIZED DATA

(71) Applicant: United Services Automobile Association (USAA), San Antonio, TX (US)

(72) Inventors: John Gibson, San Antonio, TX (US); Linqiu Wu, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 345 days.

(21) Appl. No.: 16/917,296

(22) Filed: Jun. 30, 2020

(51) Int. Cl.
  *G06Q 20/40* (2012.01)
  *G06F 18/2413* (2023.01)
  *G06F 21/62* (2013.01)
  *G06N 20/00* (2019.01)

(52) U.S. Cl.
  CPC ... *G06Q 20/4016* (2013.01); *G06F 18/24147* (2023.01); *G06F 21/6254* (2013.01); *G06N 20/00* (2019.01); *G06Q 20/4015* (2020.05)

(58) Field of Classification Search
  CPC ...... G06Q 20/00–425; G06F 21/00–88; G06F 18/00–41; G06K 9/00–6298; G06N 20/00–20
  See application file for complete search history.

(56) References Cited

U.S. PATENT DOCUMENTS

| | | | |
|---|---|---|---|
| 9,407,705 B2 * | 8/2016 | Metral | H04L 67/55 |
| 10,073,887 B2 * | 9/2018 | Chehreghani | G06F 16/22 |
| 10,387,968 B2 * | 8/2019 | Ran | G06Q 40/12 |
| 10,977,250 B1 * | 4/2021 | Lesner | G06F 16/2237 |
| 11,151,468 B1 * | 10/2021 | Chen | G06N 7/01 |
| 11,308,562 B1 * | 4/2022 | Ran | G06Q 40/12 |
| 2001/0018746 A1 * | 8/2001 | Lin | G06F 21/6218 |
| | | | 726/6 |
| 2002/0099824 A1 * | 7/2002 | Bender | G06F 21/6254 |
| | | | 709/225 |
| 2016/0140544 A1 * | 5/2016 | Howe | G06Q 20/383 |
| | | | 705/74 |
| 2016/0285704 A1 * | 9/2016 | Gasparakis | H04L 41/142 |
| 2021/0027302 A1 * | 1/2021 | Resheff | G06N 20/20 |
| 2021/0406896 A1 * | 12/2021 | Chaturvedi | G06V 10/82 |

* cited by examiner

*Primary Examiner* — John W Hayes
*Assistant Examiner* — Chenyuh Kuo
(74) *Attorney, Agent, or Firm* — Fletcher Yoder P.C.

(57) ABSTRACT

The present disclosure relates to systems and methods to generate user or user group behavior similarities based on computing distances between individual users or user groups and without using demographic data, e.g., based on anonymized data. The methods include creating a multidimensional vector representation for each user in a group by summarizing user's behaviors across various categories. Based on the created vectors, distance calculation and nearest neighbor search are performed to locate users that are most similar to target users. The resulting distance metrics may be used to rank similarities. Additionally, dimensionality reduction may be performed to further distill the behavior information to make the disclosed methods suitable for a variety of analytics and modeling tasks.

16 Claims, 12 Drawing Sheets

|  | BOOKS | CLOTHES |
|---|---|---|
| USER A | $10 | $20 |
| USER B | $7 | $5 |
| USER C | $100 | $200 |

FIG. 4A

| DISTANCE | EUCLIDEAN | COSINE |
|---|---|---|
| [A,B] | 15 | 0.12 |
| [A,C] | 201 | 0 |

FIG. 4B

| CATEGORY DESCRIPTION — 140 | EXAMPLES — 142 |
|---|---|
| AIRLINES, AIR CARRIERS | AIRLINES |
| LODGING-HOTELS, MOTELS, RESORTS | LODGING |
| CAR RENTAL AGENCIES | CAR RENTAL |
| GROUND TRANSPORTATION | TAXI, BUS, PARKING, TOLLS |
| GAS / FUEL | GAS, FUEL |
| DINING | DINING |
| DINING — FAST FOOD | FAST FOOD |
| GROCERY STORES / PHARMACIES / FOOD SERVICES / | GROCERY, FOOD, PHARMACY |
| CLOTHING / SHOES / ACCESSORIES / UNIFORMS / RETAIL STORES | CLOTHES, SHOES, BOOKS, LUGGAGE |
| FURNISHINGS / APPLIANCES / MAINTENANCE / HOME | FURNITURE, APPLIANCE |
| FINANCIAL SERVICES | BT, INSURANCE ETC |
| HEALTHCARE / CHILDCARE SERVICES | MEDICAL, DENTAL, HOSPITAL |
| PERSONAL SERVICES | COUNSELING, TAX, FUNERAL SERVICES |
| ASSOCIATIONS / ORGANIZATIONS | CHARITABLE, ACCOUNTING, FINES |
| BUSINESS / PROFESSIONAL / MISCELLANEOUS SERVICES | MARKETING, LAUNDRY, BARBER, PHOTOGRAPHIC STUDIOS |
| EDUCATIONAL SERVICES | SCHOOLS, EDUCATION SERVICES |
| ELECTRONIC AND TECHNICAL SERVICES | ELECTRONIC STORES, CABLE, TV SERVICES |
| DIGITAL GOODS | EBOOK, MOVIE, GAME |
| ENTERTAINMENT / THEATER / DANCE STUDIOS | BOWLING, THEATRE, GOLF, PARK |
| RETURN | RETURNS |

FIG. 5

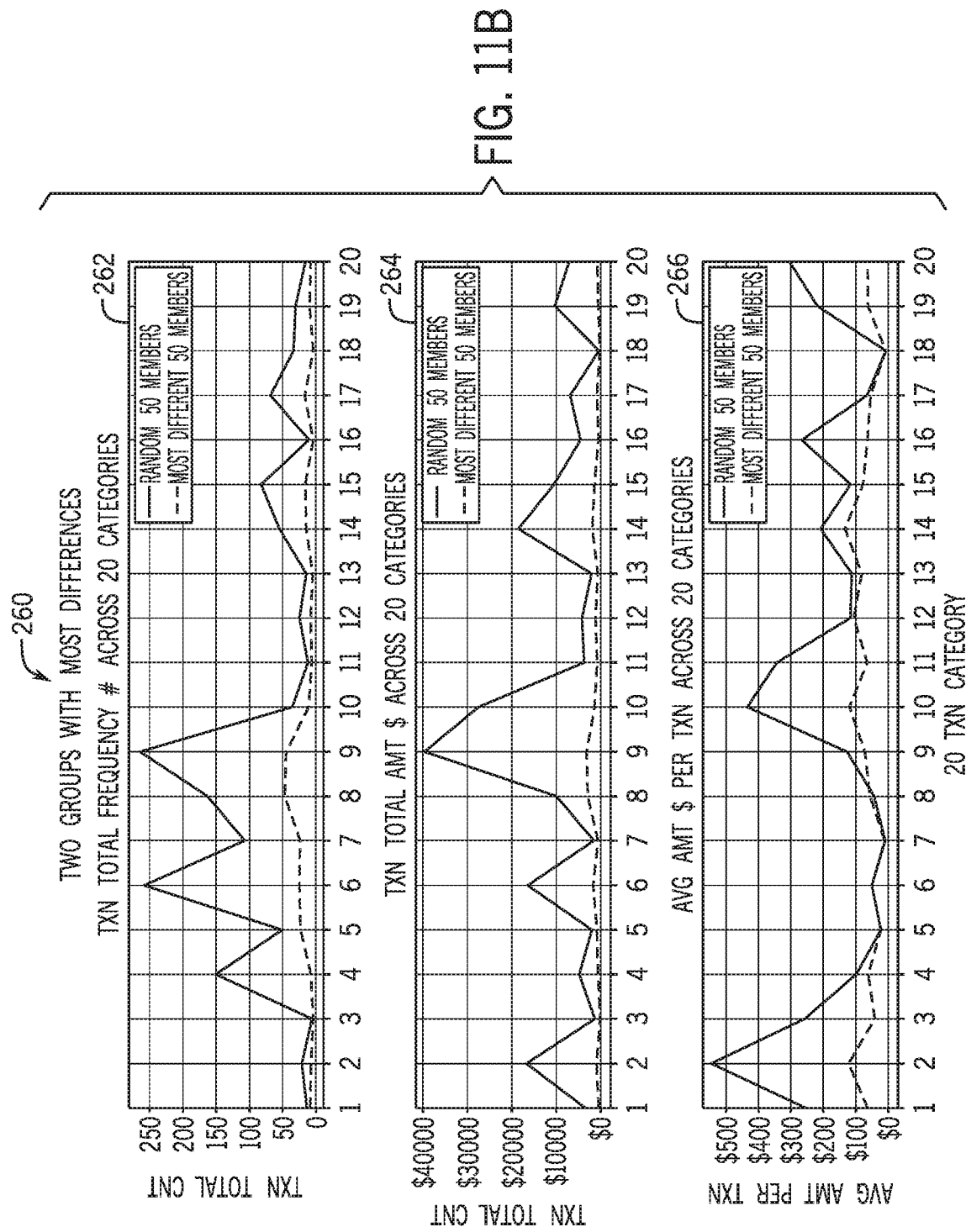

SYSTEMS AND METHODS BASED ON ANONYMIZED DATA

BACKGROUND

The present disclosure relates generally to analyzing user data while adhering to data privacy. More particularly, the present disclosure relates to systems and methods for identifying a valid transaction of a user based on look-alike users or groups of users based on anonymized data.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Services that handle user data may wish to analyze the data for the purposes of transaction validation, user authentication, other security purposes, or to identify patterns in user behavior. Such analysis may include identifying groups of users that are predicted to behave in a similar manner based on collected demographic information (e.g., location, age, race, and gender) related to the users or user groups. For example, a service provider may identify a group of clients in a particular age range that live in a particular city. The service provider may extrapolate behavior from individual members to the entire group and make decisions based on the extrapolation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods to quantify user or user group behavior similarities by computing distances between users or user groups. The methods include creating a multidimensional vector representation for each user in a group by summarizing user's behaviors across various categories. Based on the created vectors, distance calculation and nearest neighbor search are performed to locate users that are most similar to target users. The resulting distance metrics may be used to rank similarities. Additionally, dimensionality reduction may be performed to further distill the behavior information to make the disclosed methods suitable for a variety of analytics and modeling tasks.

In an embodiment, a system is provided that includes a monitoring device. The monitoring device includes a communication interface; and one or more processors coupled to the communication interface, wherein the one or more processors are configured to receive, via the communication interface, transaction data of a plurality of users; categorize the transaction data into a plurality of dimensions for each of the plurality of users; generate a plurality of vectors, the plurality of vectors comprising a vector for each of the plurality of users based on the plurality of dimensions; identify one or more closest vectors for each user from the plurality of vectors; determine, based on updated transaction data for an individual user of the plurality of users, a change in the one or more closest vectors for an individual user; and generate a notification of a potential fraudulent transaction in the updated transaction data based on the change.

In an embodiment, a method is provided that includes the steps of receiving, via a communication interface, transaction data of a user, wherein the transaction data is anonymized to exclude demographic information of the user; categorizing the transaction data into a plurality of dimensions; generating a user vector associated with the user based on the plurality of dimensions; identifying one or more closest vectors to the user vector, the one or more closest vectors comprising a first subset of vectors from a plurality of vectors stored in a database; receiving additional information indicative of a life event of the user; identifying a second subset of vectors from a plurality of vectors stored in the database based on the life event, the second subset being a predicted closest match associated with the life event; and generating one or more notifications to the user based on transaction data of a group of users associated with the second subset.

In an embodiment, a system is provided that includes a secure service application controller configured to receive transaction data of a user and to anonymize the user transaction data; a communication interface in communication with the secure service application controller and that receives the anonymized transaction data of the user; a data analysis application, comprising: a memory; and one or more processors coupled to the communication interface, wherein the one or more processors are configured access instructions from the memory to cause the one or more processors to receive, via the communication interface, the anonymized transaction data of the user; categorize the anonymized transaction data into a plurality of dimensions for the user; generate a user vector based on the plurality of dimensions; identify one or more closest vectors for the user from a plurality of vectors stored in the memory; and generate a notification to the user based on the one or more closest vectors, wherein the communication interface provides the notification to the secure service application controller, and wherein the secure service application controller associates the notification with the user and communicates or pushes the notification to a device of the user.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein:

FIG. 4A illustrates an example user group with vectors representative of user behaviors, in accordance with an embodiment of the present disclosure;

FIG. 4B illustrates the example user group of FIG. 4A with calculated distances between the corresponding vectors, in accordance with an embodiment of the present disclosure;

FIG. 5 illustrates examples of different categories for classifying the transaction data, in accordance with an embodiment of the present disclosure;

Figure 10:
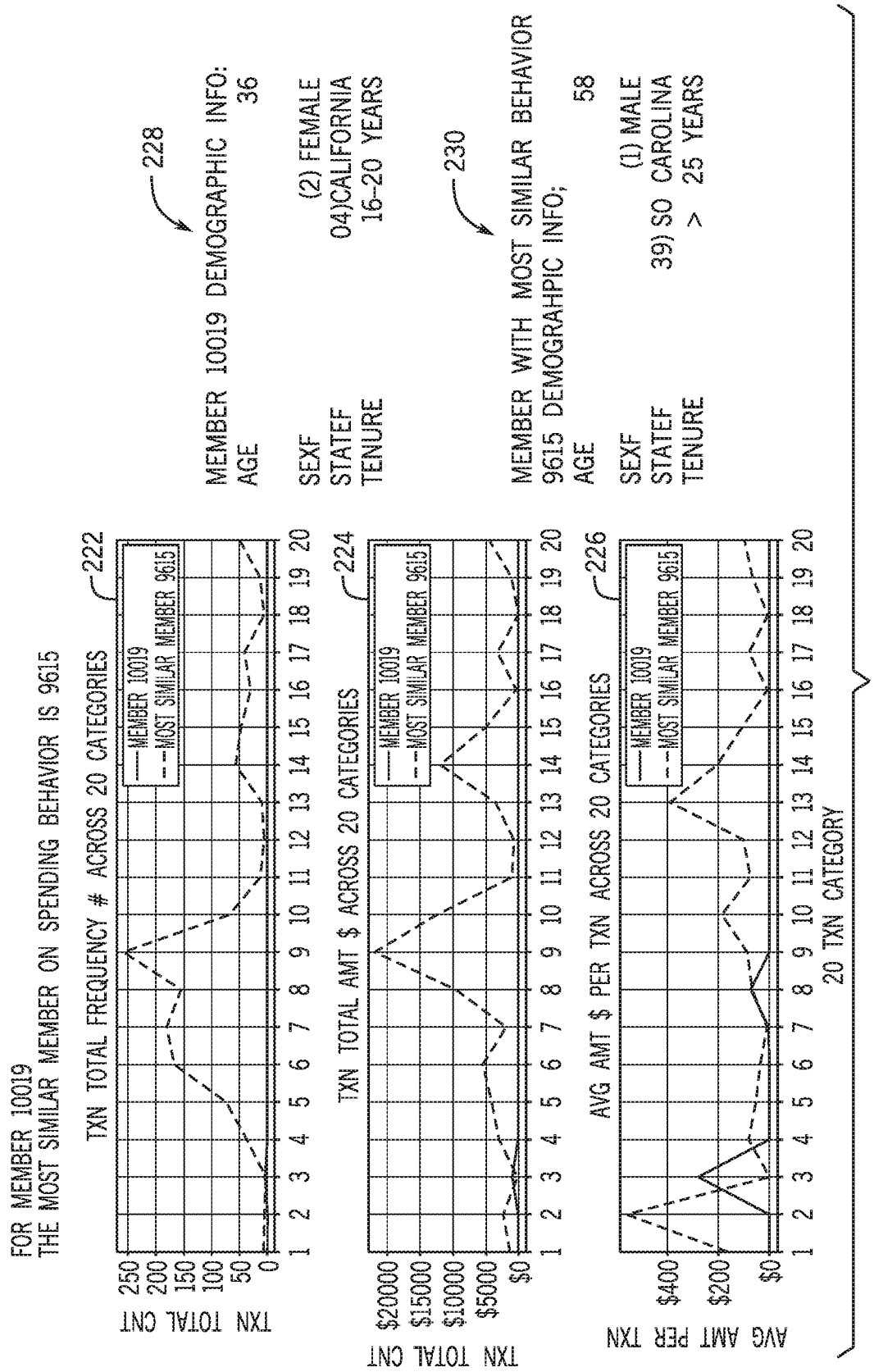
Figure 11A:
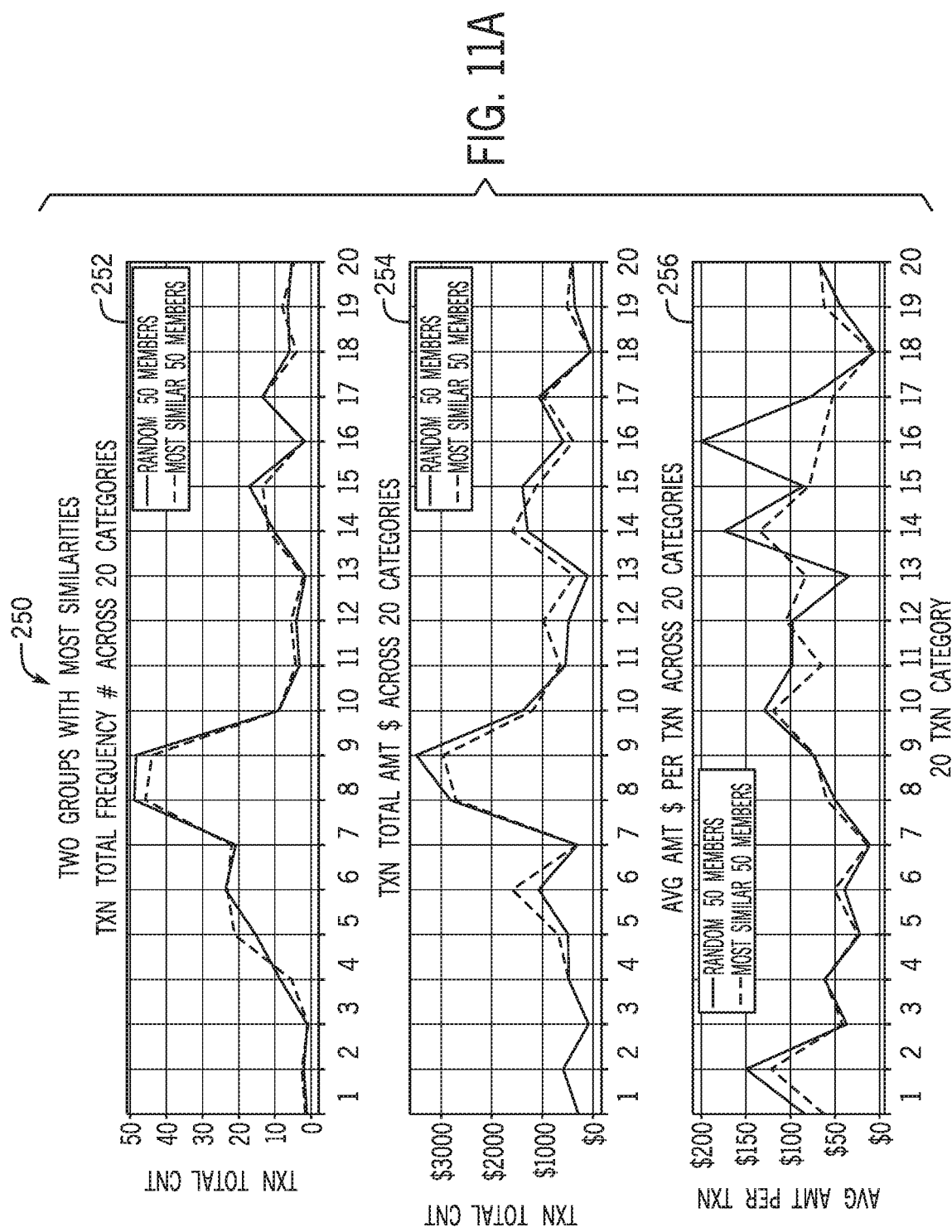

FIG. 10 illustrates an example of two users with different behaviors, in accordance with an embodiment of the present disclosure; and FIG. 11A illustrates an example of two user groups with similar behaviors, in accordance with an embodiment of the present disclosure; and FIG. 11B illustrates another example of two user groups with different behaviors, in accordance with an embodiment of the present disclosure.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

The disclosed techniques provide improvements in analyzing, validating, or authenticating user interactions using similarity analysis of anonymized user data to find look-alike users or user groups (or, conversely, least similar users). For example, using look-alike analysis or modeling, an organization (e.g., a service provider) may be able to identify users (e.g., members or clients) who may behave similarly to existing users. As such, the organization may analyze the user data relative to their identified look-alike user or users to validate a user transaction or authenticate the user, in one example. In another example, the techniques may flag a user transaction as likely to be invalid if the transaction moves the user data towards a least similar user and away from look-alike users.

The disclosed techniques are in contrast to other validation techniques that use demographic profiles of users (e.g., members or clients) as part of data analysis. The demographic profiles are collections of characteristics about individual users, such as age, race, gender, employment, tenure, marital status, location, education, and the like. For example, users may be grouped based on age and education bands, and the service provider may flag certain groups to receive special offers or to be pushed news or notifications of interest, However, while service providers collect such demographic data, providing this data to analysis applications controlled by agents of the service provider or third parties may introduce potential breaches of privacy for their clients, because the demographic information may be potentially identifying for users. Using the demographic profiles may impose compliance risks by using potential protected user information (such as age and gender). Accordingly, providing and/or analyzing user data that includes potentially identifying demographic information for a user may introduce additional complexities in secure communication, data encryption, and requirements for reporting for any parties sending or receiving the data.

Further, in some cases, however, using the demographic profiles to find look-alike groups may not be accurate or reliable. For instance, two users with similar demographic background may behave very differently.

The disclosed embodiments provide the advantage of more accurate identification of similar users or user groups that does not involve using demographic information and that may be performed on anonymized data. Thus, the present techniques reduce communication computing complexity by permitting lower data security protocols to be enacted for the sending and receiving parties or any party that handles the data to perform the techniques disclosed herein.

In some embodiments, the techniques disclosed herein may enable a service provider to identify potential users or user groups who may who may behave similarly to existing users or user groups. For example, the service provider may use identifications based on similarity analysis to identify potential users or user groups for new product offers, and/or existing product promotional offers. Such product offers, when presented to the potential users or user groups, may increase response rates from the potential users or user groups.

As discussed in greater detail below, the present embodiments described herein provide methods to identify look-alike users or user groups based on user behavior data (e.g., user transaction data) using anonymized data, e.g., data without demographic or potentially identifying information. The methods include receiving user transaction data and categorizing the data into multiple dimensions. The methods also include generating individual vectors for each user based on the multiple dimensions of the data and identifying closest vectors for each user or user groups. Identifying the closest vectors may be based on quantifying behavior similarities of the users or user groups by computing distances between the users or user groups. Based on the created vectors, distance calculation and nearest neighbor search may be performed to locate users that are most similar to target users. The resulting distance metrics may be used to rank similarities. Additionally, dimensionality reduction may be performed to further distill the behavior information to make the disclosed methods suitable for a variety of analytics and modeling tasks. In some embodiments, the methods further include determining a change in the closest vectors based on updated user behavior data and generating a notification of a potential fraudulent behavior in the updated behavior data.

Figure 1:
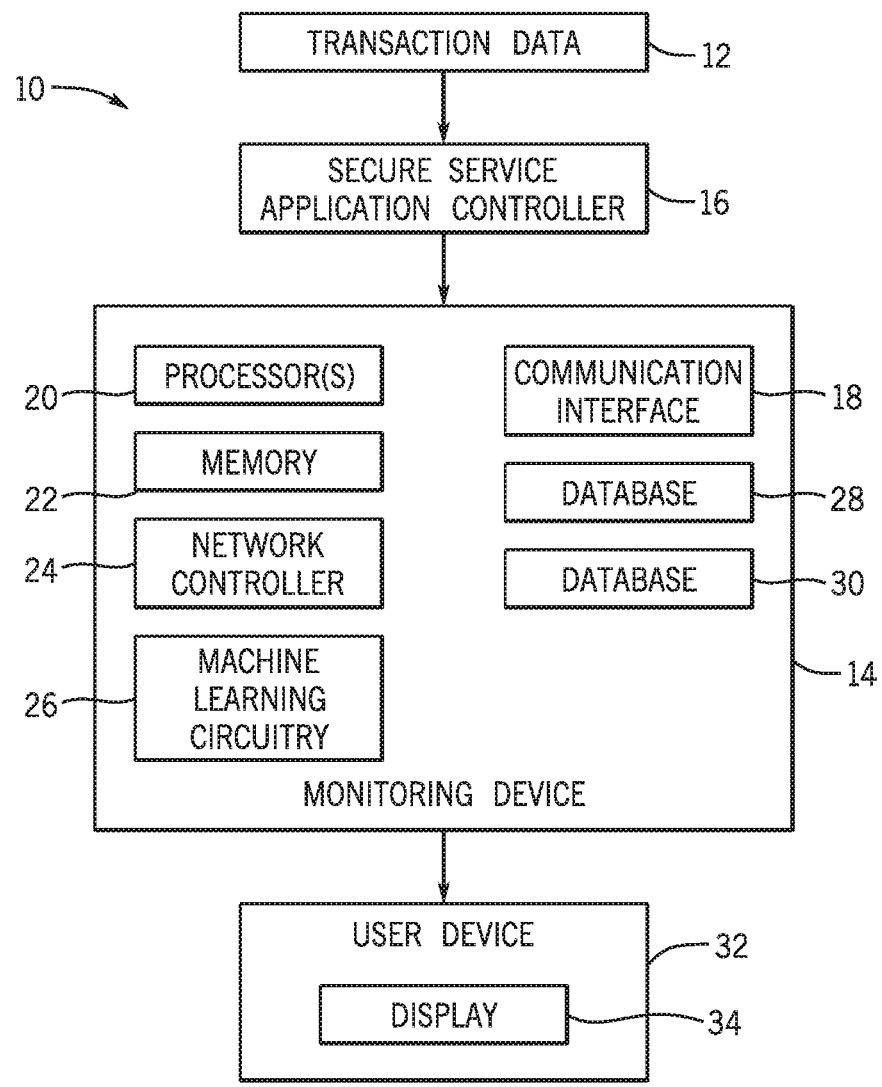
FIG. 1 illustrates a block diagram of a transaction monitoring system, in accordance with an embodiment of the present disclosure.

With the forgoing in mind, turning now to the figures, FIG. 1 illustrates a block diagram of a transaction monitoring system 10, according to implementations of the present disclosure. As shown in the example of FIG. 1, a secure service application controller 16 receives transaction data 12 of a user. The transaction data 12 may include information recorded from various transactional events, including but not limited to financial, logistical or service-related data. For example, the transaction data may include banking activities, purchases, invoices, payments, debits and credits, hotel reservations, interest paid, insurance costs and claims, and the like.

The secure service application controller 16 may operate to anonymize the transaction data 12 to exclude demographic information of the user. A monitoring device 14 may receive, via a communication interface 18, the anonymized transaction data of the user. The communication interface 18 may be in communication with the secure service application controller 16 to receive the anonymized transaction data of the user. The anonymized transaction data of the user may be analyzed by a data analysis application. The data analysis application may be executed by one or more processors 20 and may be stored on a memory 22. In some embodiments, the data analysis application may include a machine learning circuitry 26. The anonymized transaction data and analyzed data output from the data analysis application may be stored in multiple databases including a database 28 and a database 30. The processors 20 may generate a notification to the user based on the analyzed data. The communication interface 18 may provide the notification to the secure service application controller 16, which may associate the notification with the user and communicates or pushes the notification to a user device 32.

The monitoring device 14 may be any suitable type of computing device but is not limited to: a desktop computer, a laptop computer, a notebook computer, a distributed computing device (e.g., a cloud computing device), a microcomputer, a system on a chip (SoC), a system in a package (SiP), and so forth. Although examples herein may describe the monitoring device 14 as a physical device, implementations are not so limited. In some examples, the monitoring device 14 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

While in the depicted embodiment, the secure service application controller 16 is separate from the monitor 14, in other applications, the secure service application controller 16 may be integrated with or part of the monitor 14. However, the secure service application controller 16 operates to receive data including user identification information, while data analysis operations of the monitor 14 as provided herein do not receive the identification information of the user, i.e., these operations receive anonymized data. Accordingly, the secure service application controller 16, whether integrated with or separate from the monitor 14, may communicate with a first, relatively more secure, communication protocol to receive the user transaction information that includes the identification information relative to a second, relatively less secure, communication protocol with the monitor 14 (or within the monitor 14) to provide anonymized data to the data analysis operations performed by the processor 20. In one embodiment, the secure service application controller 16 communicates the anonymized data to a third party or to an application operating third party software on the monitor 14.

In an embodiment, the secure service application controller 16 may operate or include a service layer that supports functions such as, for example, data collection, device management, security, billing, location Tracking/geo-fencing, device/service discovery, and legacy systems integration, and provides these functions as services to system 10.

In general, the monitoring device 14 may capture a variety of transaction data 12 associated with the user using the communication interface 18. The communication interface 18 may be any suitable type of electronic circuitry designed to a specific standard that may enable the monitoring device 14 to communicate with other computing devices (e.g., computers or mobile phones). The communication interface 18 may also enable intercommunications between internal components (such as the processors 20, machine learning circuitry 26, and databases 28 and 30). The communications may use various communication protocols, including but not limited to Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processors 20 may be configured to process instructions for execution within the monitoring device 14. The processors 20 may include single-threaded processor(s), multi-threaded processor(s), or both. The processors 20 may be configured to process instructions stored in the memory 22. The processors 20 may include hardware-based processor(s) each including one or more cores. The processors 20 may include general purpose processor(s), special purpose processor(s), or both. The processors 20 may be communicatively coupled to other internal components (such as the communication interface 18, the machine learning circuitry 26, the databases 28 and 30). Based on the anonymized transaction data, the processors 20 may identify one or more closest vectors for the user from a group of vectors representative of a group of users.

The memory 22 may be integral or attachable. For example, the memory 22 may be inserted into and ejected from the monitoring device 14 to facilitate transfer of the transaction data 12 by moving the memory 22 between systems (e.g., the memory 22 may be shipped from a user to an organization via mail and used to transfer data to the organization's system on a periodic basis). The memory 22 may enable the user and/or the organization to store and review aspects of the transaction data 12. In some embodiments, the user and/or the organization may be permitted access to all transaction-related data stored in the memory 22. In some embodiments, the user and/or the organization may not be permitted access to certain data (e.g., privacy of the user or confidential information associated with the organization) stored in the memory 22.

The processor 20 may analyze the anonymized transaction data and generate the notification to the user based on the analyzed data. The notification may be sent to the user device 32 associated with the user via a network controller 24. The notifications may be presented to the user via a display 34. The processors 20 and the communication interface 18 may be communicatively coupled to the network controller 24.

The processors 20 may execute processing instructions stored in the memory 22. The processing instructions may instruct the processors 20 to receive anonymized transaction data of the user, using the communication interface 18 and the protocols described above. The anonymized transaction data may exclude demographic information of the user. Additionally or alternatively, the processing instructions may instruct the processors 20 to categorize the anonymized transaction data into multi-dimensional data for individual users. Based on the categorized multi-dimensional data, the processors 20 may generate vectors representative of the individual users. In some embodiments, the processors 20 may normalize the generated vectors based on certain vector dimension transformations (e.g., quantile grouping). By calculating distances between each pair of vectors, the processors 20 may identify one or more closest vectors for each user. The distance calculation may be based on Euclidean distance calculation, cosine distance calculation, other suitable distance calculations, or combinations thereof. In some embodiments, identifying the closest vectors may use a nearest neighbor search.

In some embodiments, the processing instructions may instruct the processors 20 to determine a change in the one or more closest vectors for the user, based on updated transaction data for the user. Accordingly, a notification, such as a notification of a potential fraudulent transaction in the updated transaction data based on the change may be generated by the processors 20. For example, the updated transaction data may include an abnormal transaction (e.g., purchasing order), which may be related to a potential fraudulent transaction.

In some embodiments, the processors 20 may use the communication interface 18 to communicate with a source that provides the updated transaction data to stop the potential fraudulent transaction. In some embodiments, the monitoring device 16 may use the communication interface 18 to communicate with the source to request additional information from the individual users before permitting the potential fraudulent transaction.

In some embodiments, the processors 20 may receive additional information indicative of a life event of a user, such as getting married, having a baby, losing health coverage, or being enlisted for a military service. Accordingly, the processors 20 may identify a second subset of vectors from the vectors stored in a database (e.g., database 28 or 30) based on the life event of the user. The second subset may be a predicted closest match associated with the life event of the user. The processors 20 may further generate one or more notifications to the user based on transaction data of a group of users associated with the second subset.

Some behavior analysis processes (e.g., predicting closest match associated with the life event of the user) described above may be performed by the machine learning circuitry 26 using the anonymized transaction data and additional information (e.g., information related to a life event of the user) associate with the user. The machine learning circuitry 26 (e.g., circuitry used to implement machine learning algorithms or logic) may access the anonymized transaction data and additional information to identify patterns, correlations, or trends associated with behavior related to the user. The transaction data 12 may be sourced from a multitude of diverse online services and databases, new data patterns not previously attainable based on behavior analysis without machine learning may emerge. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuitry 26 may implement different forms of machine learning. In some embodiments, a supervised machine learning may be implemented. In supervised machine learning, the mathematical model of a set of transaction data contains both the inputs and the desired outputs. The set of transaction data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. two behaviors from different users) are. It has applications in fraud detection, ranking, recommendation systems, visual identity tracking, face verification, and speaker verification.

Additionally and/or alternatively, in some situations, it may be beneficial for the machine-learning circuitry 24 to utilize unsupervised learning (e.g., when particular output types are not known). Unsupervised learning algorithms take a set of transaction data that contains only inputs, and find structure in the data, like grouping or clustering of transaction data. The algorithms, therefore, learn from test data that has not been labeled, classified or categorized. Instead of responding to feedback, unsupervised learning algorithms identify commonalities in the transaction data and react based on the presence or absence of such commonalities in each new piece of transaction data.

Cluster analysis is the assignment of a set of observations (e.g., transaction datasets) into subsets (called clusters) so that observations within the same cluster are similar according to one or more predesignated criteria, while observations drawn from different clusters are dissimilar. Different clustering techniques make different assumptions on the structure of the transaction data, often defined by some similarity metric and evaluated, for example, by internal compactness, or the similarity between users of the same cluster, and separation, the difference between clusters. Predictions or correlations may be derived by the machine learning circuitry 26. For example, groupings and/or other classifications of the transaction data may be used to predict user behaviors. The predictions may be provided to downstream applications, which may perform actions based upon the predictions. The actions that are performed may be mediated through the secure service application controller 16, either directly or through a coupled secure system, that has access to the user identification associated with the anonymized user data, to facilitate secure communication with the user or other party that is authorized by the user.

For example, the actions may include automatically pushing news or information related to the specific life event to the user device 32, whereby the news or information is selected based on the news or information in transaction data of closest match users. In this manner, the individual user having the life event is automatically presented with information that was of interest to closest match users. However, this information is pushed to the individual user without tracking cookies and in a manner that protects the data privacy of the closest matcher users by keeping the identities associated with their transaction data at arm's length from that of the individual user. In this manner, certain types of health information may be provided, or predicted, while complying with health privacy regulations.

The user device 32 may include any suitable type of computing device. In some instances, the user device 32 is a portable computing device such as a smartphone, tablet computer, wearable device, implanted computer, automotive computer, portable gaming platform, and so forth, the location of which may change throughout the course of a day or other period of time as the user moves about. In some embodiments, the user device 32 may also be a less portable type of computing device, such as a desktop computer, laptop computer, game console, smart appliance, and so forth.

In particular, the user device 32 and the monitoring device 16 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, 5G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

Figure 2:
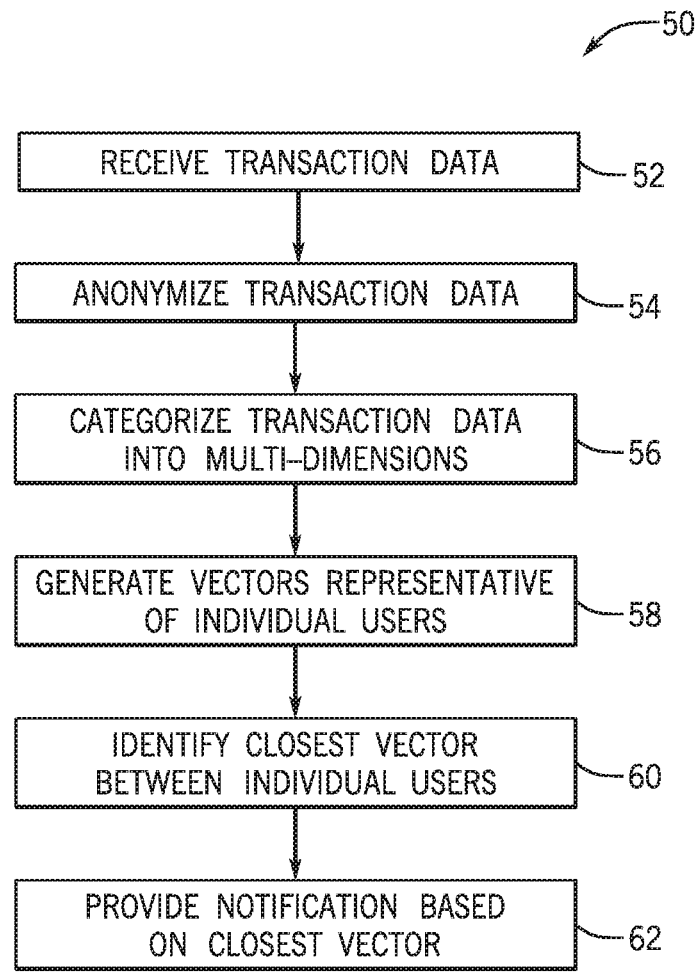
FIG. 2 depicts a flow chart for identifying a closest vector based on analyzing transaction data using the transaction monitoring system of FIG. 1, in accordance with an embodiment of the present disclosure.

Additional details with regard to analyzing user behavior similarities, along with other technologies for consolidating behavior analytics associated with users or user groups, will be discussed in detail below with reference to FIGS. 2-11. With the preceding in mind, FIG. 2 depicts a flow chart for identifying a closest vector based on analyzing transaction data using the transaction monitoring system 10 of FIG. 1, according to implementations of the present disclosure.

At block 52, the transaction monitoring system 10 may receive transaction data (e.g., the transaction data 12). As provided herein, the transaction data may be associated with an individual user (e.g., a member or client) of a service provider. For example, the transaction data may be associated with a user identification number that is associated with a user profile, and the user profile includes stored demographic information of the user. The stored demographic information may be stored in a database that is integrated with or accessible through the secure service application controller 16. However, the stored demographic information may not be generally accessible to the processor 20 performing the data analysis operations. In turn, the transaction monitoring system 10 may anonymize the transaction data (block 54) to exclude demographic information of the user and/or user identification information. That is, the anonymized data does not include or is not linked to user identification information, including the demographic information.

However, it should be understood that the transaction data for an individual user, while anonymized, is nevertheless retained as data of a single anonymous user. That is, in an embodiment, data for different users is not mixed in the data analysis. After transaction data anonymization, the transaction monitoring system 10 may categorize the transaction data into multi-dimensions (block 56).

In some embodiments, the transaction data, the anonymized transaction data, and the categorized transaction data may be stored into different databases. For example, the transaction data 12 and the categorized transaction data associated with existing users may be stored into the database 28, and the transaction data 12 and the categorized transaction data associated with new or potential users may be stored into the database 30 respectively.

The transaction data may include many categories related to different types of user behaviors or user events, such as lodging, rental, transportation, dining, personal service, education, entertainment, insurance, and the like. For large group of users (e.g., millions of users), analyzing behavior based on large amount of transaction data may be difficult (e.g., due to limited computational resources or long turnaround time). The transaction data may be categorized into multi-dimensional data based on a number of categories (e.g., 20 categories). In some embodiments, the transaction data may be pre-selected based on certain criteria. Such categorization and/or pre-selection may simplify the structure of the transaction data, therefore improving efficiencies of downstream operations (e.g., data storage, data analysis, vector generation, distance calculation, nearest neighbor searching, matching and ranking) and/or reducing turnaround time.

Based on the categorized transaction data, the transaction monitoring system 10 may generate vectors representative of individual users (block 58). Each vector may include a multi-dimensional array of transaction data. The dimension of each vector may depend on the number of categories used to categorize the anonymized transaction data. The vectors may be used to compare behavior similarities/differences between the individual users. Additional details with regard to categorizing the anonymized transaction data 2 and generating the vectors will be discussed below with reference to FIGS. 5-6.

Utilizing the generated vectors representative of individual users, the transaction monitoring system 10 may identify a closest vector between individual users (block 60). The closest vector may be determined based on distance calculation. The calculated distance may be used as a quantitative representation of the behavior similarities/differences between the users or user groups. The distance calculation may be based on Euclidean distance calculation, cosine distance calculation, other suitable distance calculations, or combinations thereof. In some embodiments, identifying the closest vectors may use a nearest neighbor search or other suitable search algorithms/methods.

Further, the transaction monitoring system 10 may provide a notification based on the closest vector (block 62). The notifications may be sent to a user or a vendor as an indication that certain behavior analysis or fraudulent transaction may be available for review. For example, the transaction monitoring system 10 may provide visual, vibrational, and/or auditory displays/indications/alerts in response to the identified closest vector.

Figure 3:
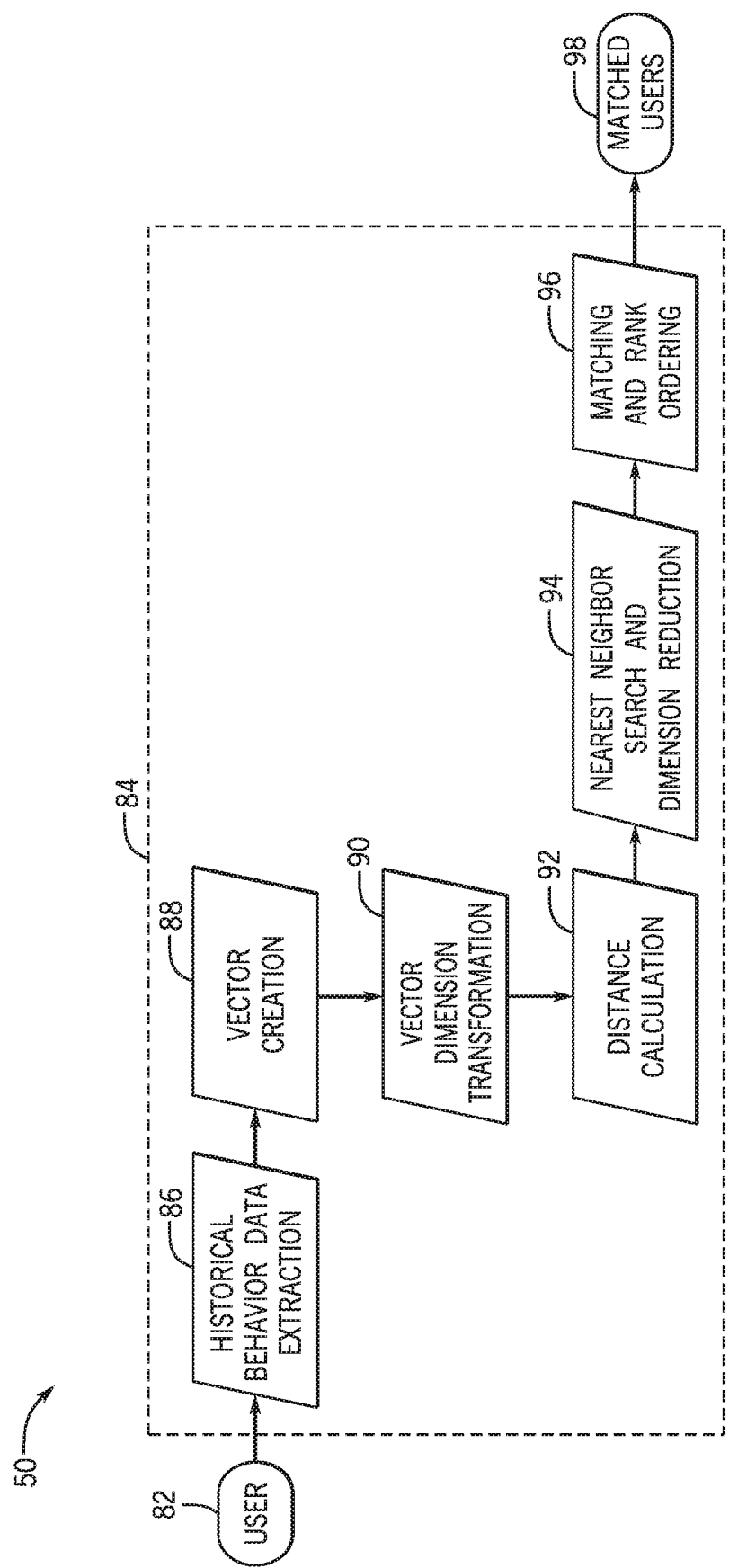
FIG. 3 depicts a flow chart for analyzing behavior data (e.g., transaction data) of a group of users and identifying a matched user for each user in the group, in accordance with an embodiment of the present disclosure.

Turning to FIG. 3, a flow chart for analyzing behavior data (e.g., transaction data) of a group of users and identifying a matched user for each user in the group, according to implementations of the present disclosure. As illustrated, behavior data of a user 82 may be input to a behavior analysis process 84. The behavior analysis process 84 may include a series of processing blocks for performing the behavior analysis and identify matched users 98 based on the behavior analysis. The vectors representative of the matched users 98 have shortest distance with respect to the vector representative of the user 82.

As illustrated, the behavior analysis process 84 may start with a historical behavior data extraction (block 84). The historical behavior data may include historical behavior data of the user 82 and historical behavior data of other users selected for finding the matched users 98 among them. The historical behavior data extraction may include anonymizing the historical behavior data to exclude demographic information of each user and categorizing the anonymized historical behavior data into multi-dimensional data for each user. The historical behavior data may include many categories related to different types of user behaviors (e.g., lodging, rental, transportation, dining, education, and entertainment). The historical behavior data may be categorized into multi-dimensional data based on a limited number of categories (e.g., 20 categories). In some embodiments, the historical behavior data may be pre-selected based on certain criteria.

Based on the multi-dimensional data categorized from the historical behavior data, a vector creation (block 88) may be performed to generate vectors representative of the user 82 and other users. Each vector may include a multi-dimensional array of behavior data. The dimension of each vector may depend on the number of categories used to categorize the behavior data. The vectors may be used to compare behavior similarities/differences between the user 82 and other users.

In some embodiments, the generated vectors may be normalized based on a vector dimension transformation (block 90), such as a quantile grouping/encoding. The quantile encoding may be performed for each vector dimension before distance calculations. Transforming each vector dimension may normalize the vectors by removing certain differences (e.g., scaling difference) between different vectors and/or different vector components.

The quantile encoding may provide an automatic way to transform a numeric input variable to have a different data distribution, which in turn, may be used as input to a predictive modeling. In some embodiments, the quantile encoding may change the probability distribution by dividing a range of discrete data (e.g., the historical behavior data with many dimensions) into continuous intervals with equal probabilities.

After the vector dimension transformation, a distance calculation (block 92) may be performed by calculating distances between the user 82 and each of the other users. The distance calculation may be based on Euclidean distance calculation, cosine distance calculation, other suitable distance calculations, or combinations thereof.

The Euclidean distance calculation measures absolute differences in distance including direction and magnitude. A Euclidean distance may be a straight-line distance between two non-zero vectors in Euclidean space. The Euclidean distance may be calculated using Formula 1 as shown below:

Formula 1
$$d(p, q) = \sqrt{(p_1 - q_1)^2 + (p_2 - q_2)^2 + \ldots + (p_i - q_i)^2 + \ldots + (p_n - q_n)^2} = \sqrt{\sum_{i=1}^{n}(p_i - q_i)^2}.$$

Based on the Formula 1, the Euclidean distance between two vectors, p and q, may be calculated by summing up the square of a difference between each pair of vector components ($p_i$-$q_i$, where i is vector component index ranging from 1 to n, n is the dimension number of the vector p and q) and then taking a square root of the summation.

The cosine distance calculation measures cosine similarity (or angular similarity) by angle distance (directional only). Cosine similarity may be a measure of similarity between two non-zero vectors in an inner product space. The cosine similarity and cosine distance may be calculated using Formula 2 as shown below:

The cosine similarity is defined as

The cosine similarity is defined as    Formula 2
$$\text{Cosine Similarity} = \frac{\sum_{i=1}^{R} x_i y_i}{\sqrt{\sum_{i=1}^{n} x_i^2} \sqrt{\sum_{i=1}^{n} y_i^2}}$$

The cosine similarity is defined as

Cosine Distance = 1 − Cosine Similarity

The cosine distance is then defined as

Cosine Distance=1−Cosine Similarity    Formula 2

Based on the Formula 2, the cosine similarity between two vectors, x and y, may be calculated using vector components $x_i$ and $y_i$, where i is vector component index ranging from 1 to n, n is the dimension number of the vector x and y.

A Nearest neighbor search (block 94) may be performed for identifying one or more closest vectors for each user. The distance calculation may be based on Euclidean distance calculation, cosine distance calculation, other suitable distance calculations, or combinations thereof. In some embodiments, identifying the closest vectors may use a nearest neighbor search.

The nearest neighbor search herein is a type of proximity search used for optimization problems of finding a vector in a given space (e.g., Euclidean space or inner-product space) that is closest (or most similar) to a given vector. Various solutions to the nearest neighbor search problems may be used, including but not limited to exact methods such as linear search and space partitioning, and approximation methods such as greedy search in proximity neighborhood graphs, locality sensitive hashing, nearest neighbor search in spaces with small intrinsic dimension(s), projected radial search, vector approximation, compression or clustering based search, and other suitable neighbor search methods.

In some embodiments, the nearest neighbor search may use machine learning. For example, a supervised machine learning algorithms such as a k-nearest neighbors (KNN) algorithm may be used to identify closest vectors in a group of vectors. In some embodiments, certain computing devices or elements such as the machine learning circuitry 26 may be used to support the machine learning.

In some embodiments, the block 94 may include a dimensionality reduction. The dimensionality reduction may include processes of reducing the number of random variables under consideration by obtaining a set of principal variables. For example, a predictive model based on behavior analysis may be more sensitive to certain categories of the behavior data than other categories. The vector components associated with the categories with less sensitivities may be excluded from the vectors. The resulting vectors may have reduced dimensions. The dimensionality reduction may reduce the computational load due to a size of the vectors used in behavior analysis, limited computing resources, fast turnaround for specific purposes (e.g., identifying fraudulent transactions), or the like.

The dimensionality reduction may use a variety of techniques, including but not limited to Principal component analysis (PCA), Non-negative matrix factorization (NMF), Kernel PCA, Graph-based kernel PCA, Linear discriminant analysis (LDA), Generalized discriminant analysis (GDA), Autoencoder, T-distributed Stochastic Neighbor Embedding (t-SNE), Uniform manifold approximation and projection (UMAP), and the like.

After nearest neighbor search and dimensionality reduction, a matching and rank ordering (block 94) may be performed to finding the matched users 98 and ranking the matched users 98 in a particular order (e.g., from a matched user with shortest distance with respect to the user 82 to a matched user with longest distance with respect to the user 82, or vice versa.

In an embodiment, the rank ordering of the matched users may be used to activate various notifications or downstream actions. In one example, a particular user may be matched with one or more closest match users based on distance. As updated transaction data for the individual user is added to the analysis, the ranked list may change as a result of the change in the vector distance based on new dimension data. Changes generated by the updated transaction data that cause distance changes exceeding a preset threshold between closest match users (i.e., that increase the distance between two users that were previously closely matched) may be flagged as potentially fraudulent or not authorized. Accordingly, one or more transaction can be flagged, a notification to the user can be provided, and, in one example, a credit card can be frozen such that additional transactions are not authorized pending further review. In another example, transactions that move closest match users closer together or do not significantly change (e.g., less than a threshold distance) the distance between closest matched users may be validated or authorized. Accordingly, the disclosed techniques may be used to validate or authorize new transaction data based on conformance to the established set of closest match users. Because the closest match users are generated based on more accurate and efficient techniques, the identification of valid or invalid transaction is also improved. In another embodiment, the disclosed techniques may be used to validate migration of data from legacy systems via generation of new transaction data that conforms to or maintains the ranked list of closest match users.

FIG. 4A and FIG. 4B illustrate an example user group with vectors representative of user behaviors and calculated distances between the corresponding vectors, according to implementations of the present disclosure. FIG. 4A shows a table 120 including a group of users (Users A, B, and C) and their spending on books and clothes. For example, User A may spend $10 on purchasing books and $20 on clothes, and User C may spend $100 on purchasing books and $200 on clothes. Accordingly, three vectors, A, B and C may be created to represent the spending of respective users on two different categories (books and clothes). For example, the vector A representative of the spending of the User A may include two vector components, 10 and 20.

Based on the created vectors representative of the spending of the users, Euclidean and cosine distances between each pair of the users may be calculated using the Formula 1 and 2 described above. The calculated distances are presented in a table 122 of FIG. 4B, as illustrated. For example, the Euclidean distance [A,B] between the vectors A and B is 15 and the cosine distance is 0.12.

FIG. 5 illustrates examples of different categories for classifying the transaction data, according to implementations of the present disclosure. In illustrated embodiment, user transactions (e.g., credit card spending) may be classified into 20 categories, as shown in a column 140. These 20 categories may be used to categorize the transaction data. The 20 categories may include airline, lodging, car rental, ground transportation, gas, dinning, and so on. Examples of each category listed in the column 140 are shown in a column 142. For example, a ground transportation category may include taxi, bus, parking, and tolls.

In some embodiments, categories (e.g., the 20 categories listed in the column 140) may be based on certain standards. For example, A Merchant Category Code (MCC) code is used in present embodiment. The MCC code is listed in ISO 18245 for retail financial services. The MCC may be used to classify a business by the types of goods or services it provides.

Figure 6:
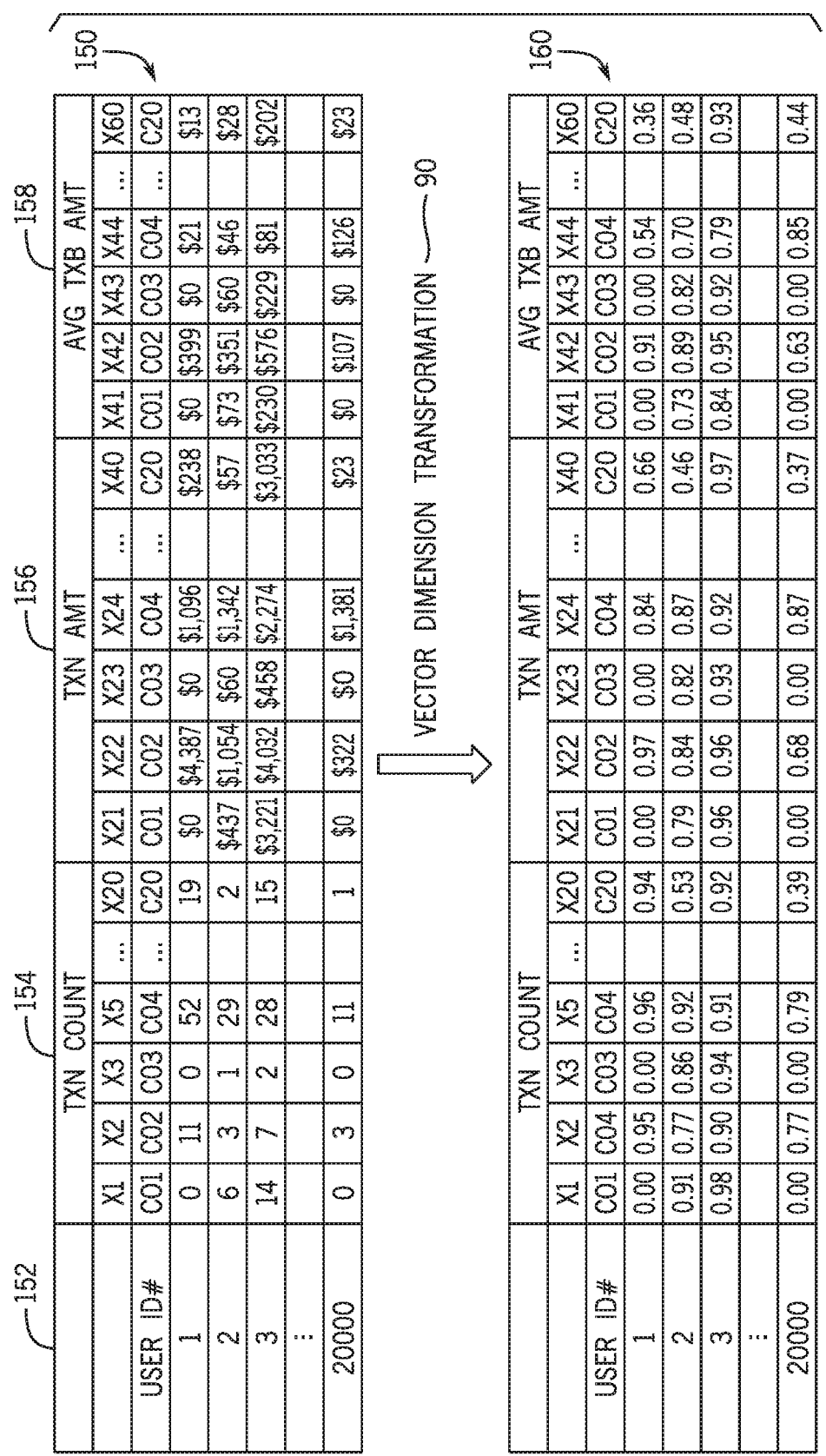
FIG. 6 illustrates an example of vector dimension transformation, in accordance with an embodiment of the present disclosure.

With the forgoing in mind, FIG. 6 illustrates an example of vector dimension transformation, according to implementations of the present disclosure. In an embodiment, certain behavior data, such as credit card spending behavior of a group of users (e.g., over two million customers of an organization), may be analyzed to identify valid transactions of the user based on look-alike users or groups of users based on anonymized behavior data.

To reduce the computational load and/or turnaround time of the behavior analysis (e.g., due to the large number of the users), a pre-selection of behavior data may be implemented to reduce an amount of data to be analyzed in downstream operations (e.g., data storage, data analysis, vector generation, distance calculation, nearest neighbor searching, matching and ranking). The pre-selection of behavior data may use certain criteria or thresholds. For example, the pre-selection of behavior data may include identifying users that spend at least $50 each quarter in a given year on their credit cards. Furthermore, a smaller group of users (e.g., 20,000 customers among over two million customers) may be randomly selected (e.g., regardless of demographic information of the users). After the pre-selection, behavior data for the smaller group of users may be extracted. An anonymization of the extracted behavior data is implemented to exclude demographic information of the user.

The anonymized credit card spending behaviors of the 20,000 users may be categorized into 20 categories. For each user, three sets of dimension information across the 20 categories may be calculated, including a total number of transactions (TXN count), a total spending amount of transactions (TXN amt), and an average spending amount per transaction (Avg TXN amt). Resulting vector for each user may have 60 dimensions, as shown in a table 150.

Table 150 shows some example vectors described above. Each row in the table 150 (except first two rows on top of the table 150) represents a vector. Each vector mas be associated with a unique user identification number (User ID #) listed in column 152. The user ID #ranges from 1 to 20,000 in present example. Each vector has 20 components (from X1 to X20) associated with the TXN count listed in column 154, 20 components (from X21 to X40) associated with the TXN amount listed in column 156, and 20 components (from X41 to X60) associated with the average TXN amount.

As mentioned previously, the vector dimension transformation (block 90), such as the quantile grouping/encoding may be performed for each vector dimension before distance calculations. Transforming each vector dimension may normalize the vectors by removing certain differences (e.g., scaling difference) between different vectors and/or different vector components. The transformed vectors are shown in a table 160.

Provided herein are certain examples of data analysis as provided herein to identify look-alike or least similar users. While the disclosed examples may reference user identification and/or demographic information, it should be understood that this is for the purposes of demonstrating that the disclosed techniques are as robust as, or in some cases more robust than, analysis using demographic features alone. Further, in certain embodiments, the data analysis may assign identification numbers to the anonymized data to facilitate comparisons between vectors of individual anonymous users (e.g., clients or members).

It should also be understood that, because the data is anonymized, updated calculations may be performed de novo upon receipt of updated transaction information by the secure service application controller 16. That is, the monitoring device 14 may receive updated data for an anonymous individual user. However, in an embodiment, the monitoring device 14 may not be able to correlate previously received data with updated data for an individual user. In another embodiment, the secure service application controller 16 may assign an anonymous user ID, which may be transmitted with updated data so that the monitor 14 can correlate the updated data to previously received data. However, as disclosed, the data analysis is performed using anonymized data.

Figure 7:
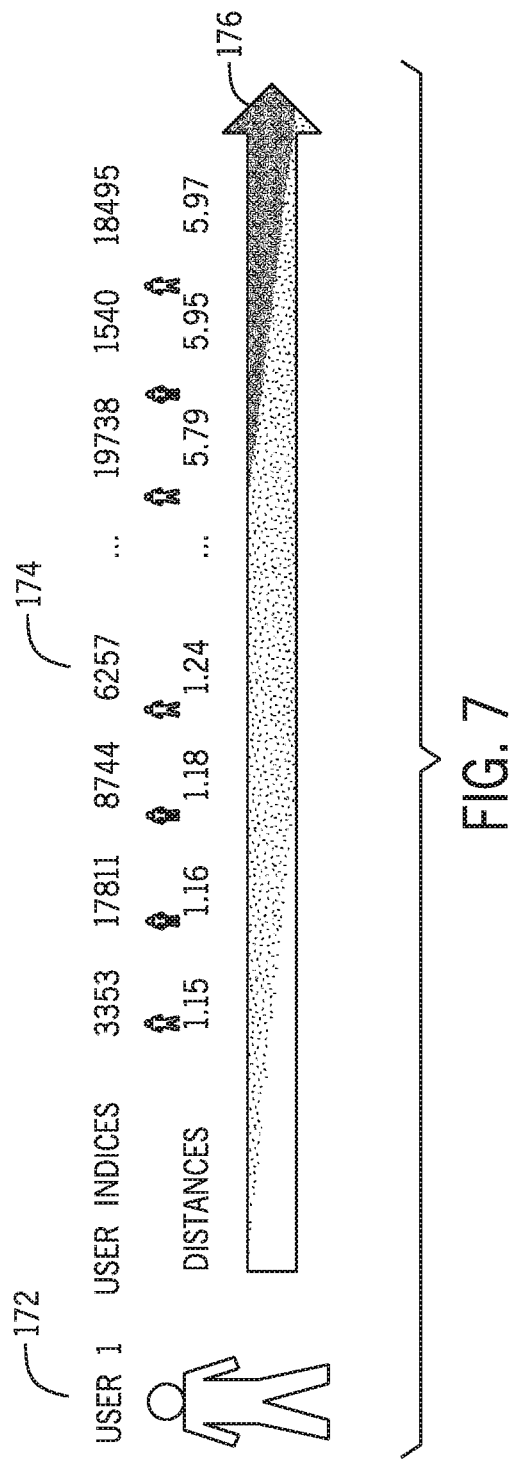
FIG. 7 illustrates examples of calculated distances between a user and the other users in a user group, in accordance with an embodiment of the present disclosure.

FIG. 7 illustrates examples of calculated distances between a user and the other users in a user group, according to implementations of the present disclosure. The calculated distances in this example are Euclidean distances calculated from the transformed vectors in table 160 of FIG. 6 based on the Formula 1. A pre-selected user 172 with a unique user ID #(e.g., user 1) is used as a reference point and a distance associated with the user 172 is zero. Distances between the user 172 and other users 174 (with unique ID #ranging from 2 to 20,000) are presented along an increased distance direction 176. A shortest distance indicates most similar behavior, while a longest distance indicates most different behavior. For example, a user with user ID #3353 is identified with a shortest distance with respect to the user 172. As such, the vector associated with the user 3353 is identified as the closest vector in the group. The user 3353 may have the most similar behavior as the user 172 in the group. In contrast, a user with user ID #18495 is identified with a longest distance with respect to the user 172. As such, the vector associated with the user 18495 is identified as the farthest vector in the group. The user 18495 may have the least similar behavior as the user 172 in the group.

With the forgoing in mind, several examples of comparing behavior similarities or differences between users or user groups are illustrated in FIGS. 8-11. These examples are generated using the implementations described above. It should be noted that these examples are based on Euclidean distance calculations measuring absolute differences in distance.

Figure 8:
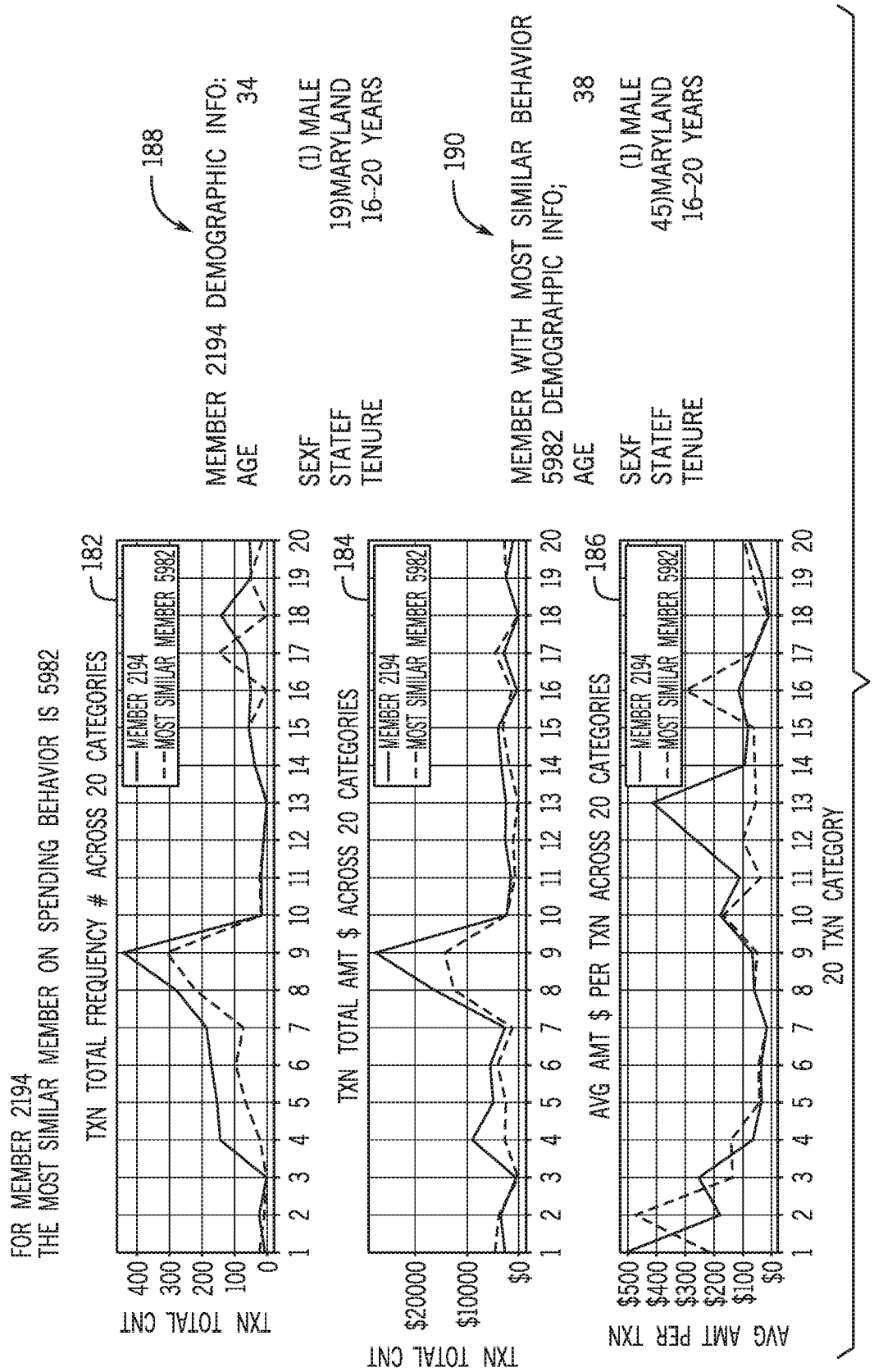
FIG. 8 illustrates an example of two users with similar behaviors and demographics, in accordance with an embodiment of the present disclosure.

FIG. 8 illustrates an example of two users with similar behaviors and demographics, according to implementations of the present disclosure. For a given user, such as a user with user ID #2194, his/her TXN counts, TXN amount, and average TXN amount across the 20 categories described above are plotted in plots 182, 184, and 186, respectively. Another user with user ID #5982 is identified as the most similar user that has the closest vector with respect to the user 2194. That is, the user 5982 has the most similar behavior (e.g., spending behavior) relative to the user 2194. The user 5982's TXN counts, TXN amount, and average TXN amount across the 20 categories are plotted in plots 182, 184, and 186, respectively.

As illustrated, plotted curves between the user 2194 and user 5982, such as the plotted TXN count curves, TXN amount curves, and average TXN amount curves, show matches in magnitudes and trends between the two users. The result shows that a user having a closest vector with respect to a reference user may have the most similar behavior as the reference user.

Demographic information of the user 2194 and user 5982 are also presented as demographics 188 and demographic 190, respectively. The demographics of the two users are similar in certain categories such as age, gender, and tenure.

Figure 9:
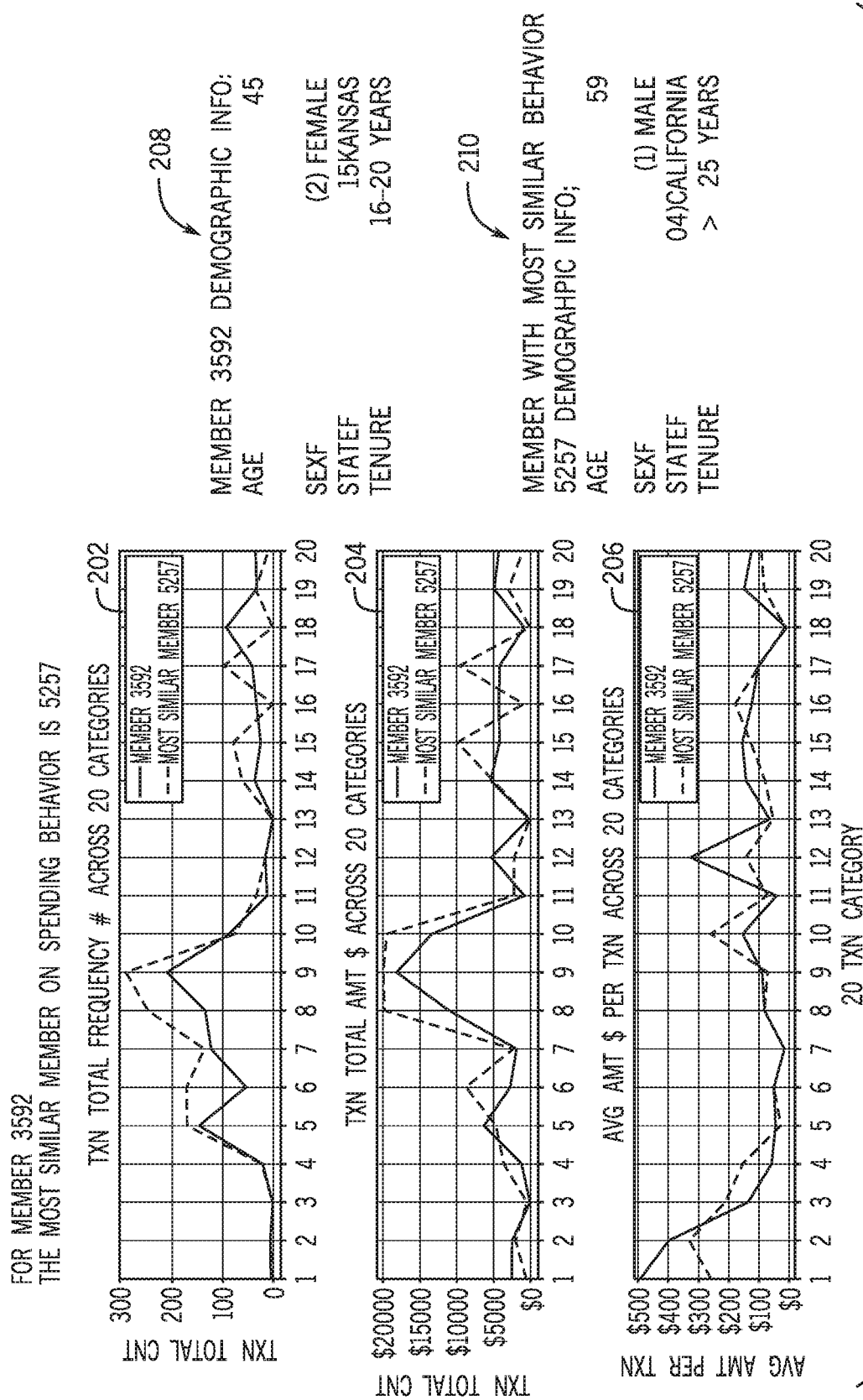
FIG. 9 illustrates an example of two users with similar behaviors but different demographics, in accordance with an embodiment of the present disclosure.

FIG. 9 illustrates an example of two users with similar behaviors but different demographics, according to implementations of the present disclosure. For a given user, such as a user with user ID #3592, his/her TXN counts, TXN amount, and average TXN amount across the 20 categories are plotted in plots 202, 204, and 206, respectively. Another user with user ID #5257 is identified as the most similar user that has the closest vector with respect to the user 3592. That is, the user 5257 has the most similar behavior (e.g., spending behavior) relative to the user 3592. The user 5257's TXN counts, TXN amount, and average TXN amount across the 20 categories are plotted in plots 202, 204, and 206, respectively.

As illustrated, plotted curves between the user 3592 and user 5257, such as the plotted TXN count curves, TXN amount curves, and average TXN amount curves, show matches in magnitudes and trends between the two users. The result shows that a user having a closest vector with respect to a reference user may have the most similar behavior as the reference user.

Demographic information of the user 3592 and user 5257 are also presented as demographics 208 and demographic 210, respectively. In contrast to previous example shown in FIG. 8. The present example shows demographics of the two users are very different. As mentioned previously, using the demographic profiles to find look-alike groups may not be accurate or reliable in some cases. For instance, two users with very different demographics may behave similarly, while other two users with similar demographics may behave very differently.

FIG. 10 illustrates an example of two users with different behaviors, according to implementations of the present disclosure. For a given user, such as a user with user ID #10019, his/her TXN counts, TXN amount, and average TXN amount across the 20 categories are plotted in plots 222, 224, and 226, respectively. Another user with user ID #9615 is identified as the most different user that has the farthest vector with respect to the user 10019. That is, the user 9615 has the most different behavior (e.g., spending behavior) relative to the user 10019. The user 9615's TXN counts, TXN amount, and average TXN amount across the 20 categories are plotted in plots 222, 224, and 226, respectively.

As illustrated, plotted curves between the user 10019 and user 9615, such as the plotted TXN count curves, TXN amount curves, and average TXN amount curves, show no match in magnitudes and trends between the two users. The result shows that a user having a farthest vector with respect to a reference user may have the most different behavior as the reference user.

Demographic information of the user 2194 and user 5982 are also presented as demographics 188 and demographic 190, respectively. The demographics of the two users are very different.

The technologies disclosed herein may be applied to analyzing behavior similarities/differences between two user groups each having different group members. For example, vectors representative of individual user groups are used to calculate distances between different user groups and identify closest vectors for each user group.

FIG. 11A illustrates an example of two user groups 250 with most similar behaviors. Each group of the two user groups 250 includes 50 randomly selected users. The TXN counts, TXN amount, and average TXN amount of each group across the 20 categories are plotted in plots 252, 254, and 256, respectively. As illustrated, plotted curves between the two groups, such as the plotted TXN count curves, TXN amount curves, and average TXN amount curves, show matches in magnitudes and trends between the two groups. The result shows that a user group having a closest vector with respect to a reference user group may have the most similar behavior as the reference user group.

In contrast, FIG. 11B illustrates an example of two user groups 260 with most different behaviors. Each group of the two user groups 260 includes 50 randomly selected users. The TXN counts, TXN amount, and average TXN amount of each group across the 20 categories are plotted in plots 262, 264, and 266, respectively. As illustrated, plotted curves between the two groups, such as the plotted TXN count curves, TXN amount curves, and average TXN amount curves, show no match in magnitudes and trends between the two groups. The result shows that a user group having a farthest vector with respect to a reference user group may have the most different behavior as the reference user group.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a communication interface;
   one or more processors coupled to the communication interface; and
   a memory storing a plurality of vectors, a predictive model, and instructions that, when executed by the one or more processors, cause the one or more processors to:
   implement a secure service application controller comprising a service layer configured to:
   receive, via the communication interface, transaction data of a financial transaction associated with a user, wherein the transaction data comprises a transaction amount and merchant information; and
   anonymize the user transaction data, wherein the anonymized user transaction data excludes demographic information of the user;
   wherein the memory storing the instructions, that when executed by the one or more processors, further cause the one or more processors to:
   receive, via the communication interface from the secure service application controller, the anonymized transaction data of the user;
   categorize the anonymized transaction data into a plurality of dimensions for the user, wherein the categorizing the anonymized transaction data further comprises categorizing the anonymized transaction data based on a merchant category code associated with the information of the merchant;
   generate a user vector based on the plurality of dimensions;
   reduce the user vector by reducing a plurality of vector components of the anonymized transaction data, wherein the reducing the plurality of vector components is based on reduced dimensions of the plurality of dimensions and a plurality of variables representative of a plurality of categories associated with the predictive model;
   identify one or more closest vectors from the plurality of vectors for the user using the reduced user vector, wherein the identified one or more closest vectors are associated one or more users or user groups, wherein the secure service application controller is configured to receive multi-user transaction data of a plurality of users via the communication interface and to anonymize the multi-user transaction data, and wherein the transaction data of the user and the multi-user transaction data of the plurality of users are anonymous data that do not comprise or are not linked to identification information of the user and the plurality of users, and wherein the one or more closest vectors is not based on matching by the demographic information of the user and the plurality of users;

generate a notification associated with the transaction data to the user based on the one or more closest vectors; and transmit, via the communication interface, the notification to the secure service application controller;

wherein the secure service application controller is further configured to:

associate the notification with the user; and communicate or push the notification to a device of the user.

2. The system of claim 1, wherein the system further comprises a machine learning circuitry.

3. The system of claim 1, wherein the memory storing the instructions, that when executed by the one or more processors, cause the one or more processors to run a nearest neighbor search to identify the one or more closest vectors.

4. The system of claim 1, wherein the memory storing the instructions, that when executed by the one or more processors, cause the one or more processors to run a dimensionality reduction to reduce dimensions of the plurality of vectors.

5. The system of claim 1, wherein the user vector and the plurality of vectors are normalized based on quantile groupings.

6. The system of claim 5, wherein the quantile groupings use vector transformations based on the plurality of dimensions.

7. The system of claim 1, wherein the plurality of vectors are generated based on the anonymized multi-user transaction data.

8. The system of claim 1, wherein the identification information comprises the demographic information of the user and the plurality of users, and wherein the demographic information comprises ages and locations of the user and the plurality of users.

9. The system of claim 1, wherein the memory storing the instructions, that when executed by the one or more processors, further cause the one or more processors to calculate distances between the user vector and each of the plurality of vectors, and wherein the identifying the one or more closest vectors is based on the calculated distances.

10. The system of claim 9, wherein the calculated distances are cosine distances.

11. The system of claim 9, wherein the calculated distance are Euclidean distances.

12. The system of claim 2, wherein the memory storing the instructions, that when executed by the one or more processors, further cause the one or more processors to utilize the machine learning circuitry to access the anonymized transaction data and the additional information to identify patterns, correlations, or trends associated with behavior related to the user.

13. The system of claim 12, wherein the additional information is indicative of a life event of the user comprising getting married, having a baby, losing health coverage, or being enlisted for a military service.

14. The system of claim 1, wherein the service layer is configured to receive the transaction data of the user via a first communication protocol, wherein the one or more processors are configured to access the instructions from the memory to cause the one or more processors to receive the anonymized transaction data of the user via a second communication protocol, and wherein the first and second communication protocols have different security levels.

15. The system of claim 7, wherein the memory storing the instructions, that when executed by the one or more processors, further cause the one or more to generate a vector of the plurality of vectors for each of the plurality of users based on the plurality of dimensions.

16. The system of claim 7, wherein the memory storing the instructions, that when executed by the one or more processors, further cause the one or more processors to normalize the plurality of vectors based on one or more vector dimension transformations.

* * * * *